United States Patent Office 3,336,387
Patented Aug. 15, 1967

3,336,387
TERTIARY AMINE OXIDES
Harry D. Finch and George A. Gillies, Berkeley, Calif., assignors to Shell Oil Company, New York, N.Y., a corporation of Delaware
No Drawing. Filed Feb. 28, 1964, Ser. No. 348,260
6 Claims. (Cl. 260—583)

ABSTRACT OF THE DISCLOSURE

Tertiary amine oxides having one long-chain alkyl group which is branched on the beta carbon atom, and mixtures thereof with corresponding amine oxides having only straight-chain alkyl substituents, are effective components of detergents.

This invention relates to new tertiary amine oxides, particularly to novel tertiary amine oxides containing a long branched-chain alkyl group of special structure which imparts especially advantageous properties to the new amine oxides making them more effective components of detergents and useful for many other purposes.

Tertiary alkyl amine oxides have been proposed for a number of uses. Their applications have been considerably hampered, however, because the long-chain alkyl tertiary amine oxides heretofore available have all been compounds with a straight chain of 10 to 18 carbon atoms. These have the disadvantage that their concentrated aqueous solutions are gels which are difficult to handle and ship. Their surface-active properties also are not as advantageous as is desirable for detergent applications.

An important object of the present invention is the provision of tertiary amine oxides which do not have the disadvantages of the prior amine oxides above described. A more specific object is the provision of novel mixtures of tertiary alkyl amine oxides which form concentrated aqueous solutions of relatively low viscosity which are easy to ship and handle. Still another object of the invention is to provide new tertiary amine oxides which have desirable detergent characteristics. A further object is the provision of an efficient method for the manufacture of the new tertiary amine oxide mixtures of the invention. Other objects and advantages of the invention will be apparent from the following description of the new products and methods for their production.

We have found a special class of long-chain alkyl-di-lower alkyl amine oxides which have outstanding advantages. These are the tertiary amine oxides which have attached to the amine nitrogen two lower alkyl groups of not more than 3 carbon atoms each and one long-chain primary alkyl group substituted by a lower alkyl group attached as aside chain to the beta carbon atoms of the otherwise straight, main, primary alkyl chain. These unique branched-chain alkyl tertiary amine oxides have unexpected differences from the previously known tertiary amine oxides. They form aqueous solutions of low viscosity at relatively high concentrations and have exceptionally useful surface-active properties. This makes them particularly advantageous in detergent applications. Not only are they effective when used alone, or as the sole tertiary amine oxide component of detergent compositions, but also they are especially useful in combination with tertiary amine oxides of the previously known types. Minor amounts of the new amine oxides containing the long-chain alkyl groups of the indicated special branched structure impart improved properties to tertiary amine oxides having a long, straight, alkyl chain and two lower alkyl groups attached to the nitrogen. It is quite surprising to find that these mixtures form concentrated aqueous solutions having the desirable relatively low viscosity which makes them easily handled and shipped and also have excellent surface-active properties. Indeed, the two different types of long-chain tertiary amine oxides appear to have a synergistic relationship which makes their mixtures more advantageous than either type alone. A special feature of the invention, therefore, is the tertiary alkyl amine oxide mixtures which provide these improved results. These are mixtures of long-chain alkyl-di-lower alkyl tertiary amine oxides in which at least 50% of the long-chain alkyl groups are normal primary alkyl groups and the remaining long-chain primary alkyl groups are primary alkyl groups having a lower alkyl group of 1 to 5 carbon atoms attached to the beta carbon of the longer, and otherwise unbranched, alkyl chain. Especially advantageous novel mixtures are those in which the two lower alkyl groups attached to the nitrogen atom each contain 1 to 3 carbon atoms and the long-chain alkyl groups, both straight and branched chain, contain 10 to 18 carbon atoms while the branched-chain alkyl tertiary amine oxides represent between about 10% and 40% by weight of the total long-chain alkyl-di-lower alkyl amine oxides in the mixture. Especially suitable mixtures of this kind are mixtures of $C_{12}$ to $C_{16}$ alkyl-di-lower alkyl amine oxides. Those having methyl and/or ethyl groups as the two lower alkyl groups attached to the amine nitrogen atom are particularly useful mixtures of this kind. A subclass of amine oxide mixtures which provides special advantages are those consisting essentially of 10 to 35% by weight of branched-chain $C_{12}$ to $C_{16}$ primary alkyl dimethyl amine oxide in which the $C_{12}$ to $C_{16}$ alkyl group or groups have an alkyl group of 1 to 5 carbon atoms attached to the beta carbon atoms as the only side chain therein. The remainder of said mixture of amine oxides consists of $C_{12}$ to $C_{16}$ normal, primary, alkyl dimethyl amine oxide.

Especially desirable mixtures are those consisting essentially of 10 to 30% by weight of branched-chain alkyl amine oxides having the formula

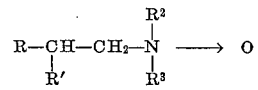

with the remainder of said mixture being normal alkyl oxides of the formula

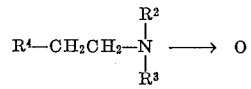

wherein R represents an alkyl radical containing 6 to 12 carbon atoms and R' represents a normal alkyl radical containing 1 to 5 carbon atoms such that the

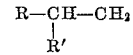

radical contains 12 to 16 carbon atoms; $R^2$ and $R^3$ represent lower alkyl radicals of 1 to 3 carbon atoms each, and $R^4$ represents a normal alkyl radical containing 10 to 14 carbon atoms.

Amine oxides of the indicated types in which the long-chain alkyl group contains an odd number of carbon atoms are an especially useful subclass of the new tertiary amines of the invention. Amine oxides of this kind have not been heretofore produced. Advantageous new compounds of this kind are, for instance, the tridecyl-dimethyl-tertiary amine oxides, the tridecyl-diethyl-tertiary amine oxides, the pentadecyl-dimethyl-tertiary amine oxides, and the pentadecyl-diethyl-tertiary amine oxides. Mixtures of these amine oxides which contain both normal and beta-alkyl-substituted long alkyl chains are particularly desirable new compositions. Examples of such mixtures are, for instance, those containing about 50% to 90% of normal tridecyl-di-lower alkyl amine oxide with 50% to 10% of one or more branched-chain tridecyl-di-lower alkyl amine oxides having as the tridecyl group a beta-$C_1$ to $C_5$-alkyl-substituted straight chain $C_{12}$ to $C_8$ alkyl group. The corresponding tertiary amine oxide mixtures, having pentadecyl radicals as the normal and beta-alkyl substituted alkyl groups, are another example of this special type of new composition of the invention.

The mixtures of amine oxides which have an even number of carbon atoms in the long, straight, and branched-chain alkyl groups, are however, also useful for the purposes of the invention. These include, for example, mixtures of normal dodecyl di-lower-alkyl amine oxides with one or more branched-chain dodecyl-di-lower alkyl amine oxides in which the dodecyl group is a beta-methyl, ethyl, propyl, butyl, or amyl-substituted undecyl, decyl, nonyl, octyl, or heptyl radical. The mixtures of a normal tetradecyl-di-lower alkyl amine oxide with one or more branched-chain tetradecyl-di-lower alkyl amine oxides in which the tetradecyl group has a methyl, ethyl, propyl, butyl, or amyl group attached at the beta-carbon of a tridecyl, dodecyl, undecyl, decyl, or nonyl radical.

A special feature of the invention is the mixtures of tertiary amine oxides containing a plurality of $C_{12}$ to $C_{16}$ normal alkyl-di-lower alkyl amine oxides together with the corresponding amine oxides having branched chain $C_{12}$ to $C_{16}$ alkyl groups with the sole branching at the beta carbon of the long chain. Most advantageously, these mixtures contain the complete series of amine oxides with straight and branched chains of 12 through 16 carbon atoms and desirably predominate in those with $C_{11}$ through $C_{15}$ alkyl groups. These blends offer advantages over those containing fewer tertiary amine oxides in the mixture.

Although it is of lesser importance, because the lower alkyl groups attached to the amine nitrogen are substantial equivalents as far as their effect on the properties of the mixtures is concerned, it is nevertheless preferred to use tertiary amine mixtures in which these lower alkyl groups are the same because the manufacture of the mixtures is usually simpler in such cases. More preferably, amine oxide mixtures having methyl or ethyl; generally most preferably methyl groups as the lower alkyl groups attached to the nitrogen atom are used.

The new tertiary amine oxide mixtures can be prepared in any suitable manner. One can, for example, make the mixtures by blending together the components in the previously indicated essential proportions so as to make the mixtures having about 10% to about 50% by weight of the branched long-chain primary alkyl-di-lower alkyl amine oxide with the remainder consisting of normal long-chain primary alkyl-di-lower alkyl amine oxides. The blending can be effected by stirring together solutions of the tertiary amines from different sources. Because of the gel consistency of the concentrated aqueous solutions of long-chain normal primary-di-lower alkyl amine oxides, it is usually more convenient to use for the blending of such amine oxides a solution containing a suitable inert liquid solvent which will lower the viscosity. Suitable solvents are, for instance, alcohols, ketones, esters, and the like. Lower boiling solvents, e.g., isopropanol, acetone, ethyl acetate, etc., which can be readily separated by evaporation from the blended amine oxides are desirable since organic solvent-free blends which have advantageous fluidity can be obtained efficiently in this way. It is not essential to remove the organic solvent where its presence will not interfere with the intended use of the new amine oxide mixtures. In such cases, higher boiling solvents can be used. However, the use of solvents can be avoided in making the new blends of tertiary amine oxides if sufficiently powerful blenders are used for mixing the gel-like solutions of normal long-chain alkyl amine oxides with the more fluid solutions of the amine oxides having branched-chain alkyl groups.

Tertiary amine oxides with long-chain normal alkyl groups can be manufactured in known ways. They can, for instance, be made by reacting long-chain normal primary alcohols such as are readily available by hydrogenating the fatty acids available from fats and oils. The primary, normal saturated alcohols having an even number of carbon atoms in the range of 10 to 18 which are so obtained can be reacted with a di-lower-alkyl amine to make the corresponding tertiary amine which is then oxidized, for instance with hydrogen peroxide, to obtain the tertiary amine oxide or oxides. For the preparation of the more preferred long-chain normal primary alkyl-di-lower alkyl amine oxides in which the long-chain alkyl group has an odd number of carbon atoms, one must use other starting material. One such suitable starting material is the long-chain primary alkyl halides, particularly chlorides, bromides, or iodides. These can be reacted with di-lower-alkyl amines to make tertiary amines which can then be oxidized to amine oxides useful in the new composition of the invention. The method is also suitable for preparing amine oxides whose long-chain alkyl groups have an even number of carbon atoms.

The tertiary amine oxides having long-chain alkyl groups with a branch at the beta-carbon atom on the chain can be made as above-described by selecting the appropriate branched-chain starting alcohol or halide.

Economy of operation can often be realized by combining one or more steps in the manufacture of the two different types of amine oxides essential in the new mixtures of the invention instead of preparing these components separately and then blending them. For example, the oxidation of the two different types of tertiary amines to amine oxides can be carried out together. The mixture of the two different types of tertiary amines for such operation can also be advantageously produced in a single step by using as starting material a mixture of the precursors of the amines which will give the required proportion of long-chain, normal and beta-alkyl-substituted alkyl groups in the product. For instance, a mixture of one or more primary normal alkyl chlorides having preferably 12 to 16 carbon atoms per molecule with one or more beta-lower-alkyl-substituted primary alkyl chloride of 12 to 16 carbon atoms per molecule in mole proportions of about 1:1 to about 9:1 can be reacted with a di-lower-alkyl amine to make a suitable mixture of tertiary alkyl amines for oxidation to the desired mixture of amine oxides having advantageous properties.

Various methods can be used in carrying out the different reactions involved in the synthesis of the new, long, branched-chain alkyl-di-lower alkyl amine oxides and the improved amine oxide compositions containing these new oxides. For the oxidation step in which the tertiary amine is converted to amine oxide, one can use Caro's acid, hydrogen peroxide, ozone, or like oxidizing agents as described in British Patent 437,566, for example, U.S. Patent 2,804,473 described another suitable method for carrying out this oxidation.

The production of tertiary amines suitable as starting material for the oxidation can be carried out by reacting alcohols or halides of proper structure with di-lower-alkyl amines as previously indicated. Suitable reaction conditions are described, for example, in British Patent 436,414. Alternatively, the long-chain alkyl primary amine or mixture thereof containing normal alkyl and branched-chain alkyl groups of the required types in proper proportion can be reacted with formaldehyde as described in U.S. Patent 2,366,534 to make long-chain alkyl-dimethyl amines convertible to tertiary amine oxides useful according to the invention.

A special feature of the invention is the provision of a particularly advantageous method for producing the new tertiary amine oxide mixtures having properly controlled proportions of the two required types of amine oxides from olefin starting materials in an efficient and economical manner. This new procedure makes use of hydroformylation of essentially straight-chain olefins with carbon monoxide and hydrogen. The reaction is controlled so as to produce a mixture of primary alcohols having normal and beta-lower ($C_1$ to $C_5$) alkyl-substituted alkyl chains in the proportions required for the new and improved tertiary amine oxide mixtures. This mixture is converted to a mixture of tertiary amines having long-chain alkyl groups corresponding to those of the alcohol mixture and two lower alkyl groups attached to the nitrogen atom, and this mixture of amines is oxidized to make the desired amine oxide mixture.

The hydroformylation can be carried out to produce aldehydes which can then be hydrogenated to alcohols, but usually it is more advantageous to prolong the reaction and effect hydrogenation of the initially formed aldehydes simultaneously with their production. The reaction is carried out in the presence of a hydrogenation catalyst, advantageously using a temperature of about 200° to 400° C. under superatmospheric pressure, preferably at least 200 atmospheres with a mole ratio of olefin to carbon monoxide to hydrogen in the range of 1:2:2 to 1:5:20. British Patent 638,754 described suitable methods of operation using cobalt, copper, nickel, or ruthenium and their carbonyls as catalysts. More advantageous results as regards proportions of straight-chain and beta-alkyl substituted alcohols can be obtained, however, by use of the complex metal carbonyl-tertiary-organo catalysts containing phosphorus, arsenic, or antimony whose use in hydroformylation is described in Belgian Patent 606,408. The disclosure of this patent is incorporated herein by reference especially for the preparation and use of the preferred cobalt carbonyl trihydrocarbyl phosphine catalysts. Especially preferred are the cobalt-carbonyl trialkyl phosphine catalysts of the formula

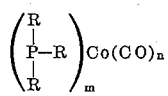

where R is alkyl of 1 to 20 carbon atoms preferably 2 to 6 carbon atoms and $m$ and $n$ are integers each equal to at least 1 and whose sum is 4. These give exceptionally good results in the process of the present invention, particularly since production of the desired beta-alkyl-substituted primary alcohols can be promoted by controlling the ratio of phosphine to cobalt in the complex carbonyl catalyst. Ratios in the range of about 2.5 to 0.5 atoms of phosphorus per atom of cobalt are useful with ratios between about 2 and about 0.8 being generally more advantageous.

Other methods can be used to favor production of the beta-alkyl substituted primary alcohols desired as starting material for the new amine oxides whether these preferred or other hydroformylation catalysts are employed in their manufacture. Particularly advantageous, for instance, is hydroformylation in the presence of a peroxide. Organic or inorganic peroxides can be used. Hydrogen peroxide, tertiary butyl hydroperoxide, and cumycl peroxide are typical examples of peroxides which can be added to increase production of the beta-alkyl-substituted primary alcohols. Only very small amounts of the order of 0.02 to about 0.2 equivalent of peroxide per 100 grams of olefin are usually satisfactory. Suitable amounts of peroxide can often be conveniently introduced by controlled air oxidation of the olefin before hydroformylation.

The starting olefins for the hydroformylation are straight-chain olefins having 10 to 18 carbon atoms, preferably about 12 to about 16 carbon atoms per molecule. Such olefins having the double bond predominantly at the end of the chain are advantageous, but it is a feature of the invention when carried out with the above-mentioned preferred catalysts one can successfully use olefins having the double bond removed from the end of the chain. Due to the shift of the double bond of the olefin to the end of the chain which takes place during the hydroformylation when these catalysts are employed, the products will be mixtures of straight-chain primary alkanols and branched-chain primary alkanols in which the only branching is an alkyl substituent, predominantly a methyl group, on the beta-carbon of the chain.

The olefins can be obtained advantageously from petroleum hydrocarbons. Because of the importance of using individual straight-chain olefins or olefinic fractions consisting essentially of straight-chain olefins as the starting material for the hydroformylation, it is advantageous to use paraffin hydrocarbon material consisting essentially of straight-chain paraffins for manufacture of the olefins. On this account, cracking of paraffin wax as described in U.S. Patent 2,172,228 is a suitable method of making the olefin. Other hydrocarbons can, however, be used as the source of the starting olefins by employing suitable treatment to insure that the products are essentially straight chain. Thus, raffinate fractions can be cracked using, for example, the methods of U.S. 2,642,466 or U.S. 2,828,-148, U.S. 2,871,254 and the product treated to separate the straight-chain olefins from branched-chain components present therewith before use in the present process. Any of the known methods for carrying out such separations can be used. Instead of cracking methods, one can employ other dehydrogenation procedures for manufacture of the straight-chain olefins. Catalytic dehydrogenation is one such suitable method advantageous for procedures for which are described in U.S. Patents 2,184,235 and 2,930,763 for example. Chlorination of paraffins and dehydrochlorination of the resulting monochlorides is another way of making suitable starting olefins for the process. On this account, straight-chain paraffins suitable for treatment in these ways can be made in various ways. Extractive crystallization with urea as described in U.S. Patents 2,549,372, 2,569,984, and 2,569,986, for instance, is one advantageous method for isolating useful straight-chain paraffins for conversion to straight-chain olefins useful as starting material in the new process.

The following examples show in more detail one method for carrying out the new process. They also illustrate various new tertiary amine oxide compositions of the invention and show some of the advantages of the new branched-chain alkyl amine oxides which are produced.

*Example I*

A mixture of $C_{12}$ through $C_{15}$ primary alkanols was produced by hydroformylating a $C_{11}$ through $C_{14}$ fraction of straight-chain olefins. The reaction was carried out in an autoclave with a complex of cobalt octoate, carbon monoxide, and tri-normal lauryl phosphine as the catalyst. The catalyst was formed in the autoclave by charging the phosphine and cobalt octoate in a mole ratio of 1.2 to 1 and heating at about 200° C. with hydrogen and carbon monoxide in a mole ratio of about 2:1. The catalyst was used in an amount corresponding to a cobalt concentration in the olefin of 0.05%.

Reaction at 190° to 210° C. and 1000 to 1200 p.s.i.g. pressure for 10 hours using a mole ratio of hydrogen to carbon monoxide of 2:1 to 2.5:1 and about 0.35 mole of potassium hydroxide in the mixture per atomic weight of cobalt, essentially complete conversion of the olefins was obtained. The alcohols recovered by distillation analyzed 80% normal primary straight-chain $C_{12}$–$C_{15}$ alkanols, 10% primary 2-methyl alkanols of 12 to 15 carbon atoms, 3% primary 2-ethyl alkanols of 12 to 15 carbon atoms and 7% primary 2-$C_3$ to $C_5$ alkyl alkanols of 12 to 15 carbon atoms.

A fraction of these alcohols was converted to tertiary amines by reaction with dimethyl amine using as catalyst 10% copper on alumina. The catalyst was packed in an externally heated vertical tube reactor down which the alcohol mixture was passed together with hydrogen and the dimethyl amine in mole ratio of 1:2:2 to 1:6:8. At 200° C. and about 300 to 600 p.s.i.g., using a liquid hourly space velocity of 1 cc. alcohol per hour per cc. of catalyst; the yield of tertiary amines is about 90%. These amines were distilled to separate unreacted dimethyl amine and amies boiling higher than the $C_{12}$–$C_{15}$ alkyl dimethyl amines from the product. The intermediate fraction was then treated with formaldehyde and hydrogen in the presence of Raney nickel catalyst to convert the primary and secondary amines present to a mixture of $C_{12}$ through $C_{15}$ alkyl-di-methyl amines in which the $C_{12}$ to $C_{15}$ alkyl groups contained the same ratio of straight to branched chains as the alcohol mixture from which they were derived.

This mixture of tertiary amines was oxidized with hydrogen peroxide of about 50% concentration using 1.50 moles of the peroxide per mole of amine, and a reaction temperature of about 50° to 70° C. In 4 to 5 hours reaction during which additional water was added, there was obtained a yield of 99% $C_{12}$ through $C_{15}$ alkyl-dimethyl amine oxides as an aqueous solution of about 30% concentrations. This mixture of amine oxides was made up of the following compounds:

| | Percent |
|---|---|
| $C_{12}$ to $C_{15}$ alkyl-dimethylamine oxides | 80 |
| 2-methyl-$C_{11}$-to-$C_{15}$-n-alkyl-dimethyl amine oxides | 10 |
| 2-ethyl-$C_{10}$-to-$C_{14}$-n-alkyl-dimethyl amine oxides | 3 |
| 2-$C_3$ to $C_5$-n-alkyl-$C_6$ to $C_{11}$-n-alkyl-dimethyl amine oxide | 7 |

Concentrated solutions of this mixture of amine oxides have a relatively low viscosity making them easy to blend with other detergent components in making products of good cleaning properties.

*Example II*

Hydroformylations of dodecene-1 were carried out using the method of Example I but employing olefin which contained about 0.2 equivalents of peroxide per 100 grams introduced by air oxidation. The resulting primary tridecanol mixture on reaction with dimethyl amine and oxidation of the resulting tertiary amines gives a mixture of tridecyl-dimethylamine oxides in which there is 44% normal tridecyl-dimethyl amine oxide and 56% branched chain tridecyl dimethyl amine oxides in which the branched-chain radicals have $C_1$ to $C_5$ alkyl groups attached to the beta carbon of primary straight chains of 8 to 12 carbon atoms.

Similar reaction using peroxide-free dodecene-1 for the hydroformylation step results in a mixture of the same tridecyl-dimethyl amine oxides but containing 78% normal tridecyl-dimethyl amine oxide.

*Example III*

Foaming tests were carried out comparing branched-chain alkyl tertiary amine oxide compositions of the invention with tertiary amine oxides having the same number of carbon atoms but containing only straight chain alkyl groups. Two compositions were made according to the invention using as starting material fractions of straight-chain olefins consisting essentially of 11 and 12 carbon atoms, respectively. These fractions were separately hydroformylated with carbon monoxide and hydrogen, and the resulting mixtures of normal and beta-alkyl-substituted dodecanols and tridecanols were reacted with dimethyl amine and the $C_{14}$ and $C_{15}$ tertiary amines so obtained were oxidized with hydrogen peroxide to make the corresponding tertiary amine oxides using the same general methods for carrying out these reactions as described in Example I. The final products were in each case mixtures of about 80% normal $C_{12}$- or normal $C_{13}$-dimethyl amine oxides with the remainder having $C_{12}$- or $C_{13}$-alkyl groups having alkyl substituents on the beta carbon. The branched-chain groups consisted of 50% with 2-methyl side chains, 15% with 2-ethyl side chains, and 33% with 2-propyl, 2-butyl, and 2-amyl side chains.

The corresponding tertiary amine oxides having only straight alkyl chains were made by separately reacting normal 1-chlorododecane and normal 1-chlorotridecene with dimethyl amine and oxidizing the resulting tertiary amines with hydrogen peroxide.

Tests of the foam performance of these amines oxides were carried out using a simulated dishwashing technique in which the soil was made up of 21.4 parts of Crisco with 7.2 parts of powdered egg. The relative performance of the tertiary amine oxides as measured by the number of simulated dishes which could be washed before the foam was destroyed when using amine oxide concentrations in the range of 0.1 to 1.1% by weight in the washing solutions was as follows:

| | Number of Simulated Dishes Washed | |
|---|---|---|
| Long chain alkyl group of the tertiary amine oxide | Amine oxide with only straight-chain alkyl groups | Amine oxide mixture of the invention containing oxides with 2-alkyl substituents or side chain |
| Dodecyl | 13.5 | 19.7 |
| Tridecyl | 18.5 | 24.7 |

These are significant differences showing that the new compounds of the invention are highly effective even in minor amounts in improving the performance of straight-chain tertiary alkyl amine oxides.

*Example IV*

By careful fractionation of a mixture of straight-chain and beta-alkyl-substituted tetradecanols produced by hydroformylation of a $C_{13}$ fraction of straight-chain olefins using the same general reaction method as described in Example I, there was separated a mixture of branched-chain alcohols containing in excess of 95% by weight of 2-alkyl-substituted tetradecanols having the same proportion of methyl through amyl substituent groups as the branched-chain alcohols described in Example II. This alcohol mixture was converted to the tertiary amine oxides by reaction with dimethyl amine and oxidation using the procedures of Example I.

Twenty percent by weight of these branched-chain tetradecyl dimethyl amine oxides in admixture with the straight-chain tetradecyl dimethyl amine oxide greatly reduces the viscosity of aqueous solutions of these amine oxides as shown by the following results for solutions of 15% weight concentration:

| | Viscosity (centipoises) at— | |
|---|---|---|
| | 100° F. | 70° F. |
| Blend of 20% branched-chain $C_{14}$ alkyl dimethyl amine oxides with 80% n-$C_{14}$ alkyl-dimethyl amine oxide | 85.0 | 122.8 |
| 100% myristyl dimethyl amine oxide | 210.8 | 337.0 |

The synergistic effect in reducing viscosity obtained by mixing amine oxides having a beta-alkyl-substituted long alkyl chain with amine oxides having unbranched long alkyl radicals is shown by the following results of tests of 15%w solutions of n-tetradecyl dimethyl amine oxide and beta-amylnonyl dimethyl amine oxide and a typical mixture of these two tertiary amine oxides containing 75%w of the normal tetradecyl dimethyl amine oxide.

|  | Viscosity (centipoises) at— | |
|---|---|---|
|  | 100° F. | 70° F. |
| n-Tetradecyl dimethyl amine oxide | 211 | 337 |
| 2-amylnonyl dimethyl amine oxide | 218 | 834 |
| Mixture of normal tetradecyl and 2-amylnonyl dimethyl amine oxides | 70 | 230 |

*Example V*

Tertiary amine oxide mixtures were prepared by the general method described in Example I using four fractions of straight-chain olefins containing, respectively, olefins of 11 to 14 carbon atoms in run (a), 12 to 14 carbon atoms in run (b), 13 carbon atoms only in run (c), and 14 carbon atoms only in run (d). The products in all cases were mixtures of about 75% to 80% straight, long-chain, primary alkyl-dimethyl amine oxides with the remainder being the corresponding beta-$C_1$ to $C_5$-alkyl-substituted primary alkyl-dimethyl amine oxides. In run (a) the long-chain alkyl groups of the amine oxides consisted of 20% dedecyl, 30% tridecyl, 30% tetradecyl, and 20% pentadecyl groups, while those from run (b) consisted of 37.5% tridecyl, 37.5% tetradecyl, and 25% pentadecyl groups.

Each of these new compositions were used in formulating liquid detergents having the following compositions where the figures are the percent by weight.

|  | Formula | |
|---|---|---|
|  | I | II |
| Alkyl dimethyl amine oxide (a), (b), (c), or (d) | 5.2 | 5.3 |
| Ethoxylated $C_{12}$—$C_{15}$ alcohol* | 1.1 | 1.2 |
| Ammonium salt of sulfate of ethoxylated $C_{12}$—$C_{15}$ alcohol | 29.2 | 14.5 |
| Sodium toluene sulfonate |  | 5.3 |
| Sodium pyrophosphate |  | 7.3 |
| Sodium sulfate |  | 7.0 |
| Water | Balance | Balance |
| Total active detergent content | 35.5 | 21.0 |

*Alcohol mixture used in making the amine oxide mixture (a) with an average of three ethoxy groups per mole.

In simulated dishwashing tests carried out as described in Example II, these detergents gave the following results when used at a concentration of 0.025%w in water of 150 p.p.m. hardness as $CaCO_3$ having a calcium to magnesium ratio of 60:40.

| Long Chain Alkyl Groups of Teritary Amine Oxide Mixture | Number of Dishes with Formula— | |
|---|---|---|
|  | I | II |
| $C_{12}$—$C_{15}$ | 22.5 | 22.0 |
| $C_{13}$—$C_{15}$ | 23.5 | 22.3 |
| $C_{14}$ | 23.0 | 21.5 |
| $C_{15}$ | 26.0 | 24.8 |

These results show that the new tertiary amine oxides are advantageous components of liquid detergents.

Still other tertiary amine oxides within the scope of the invention can be made in the same or other ways. As previously indicated, particularly desirable new amine oxides are those having a long branched alkyl chain containing an odd number of carbon atoms. Particularly preferred examples of amine oxides of this kind are the $C_{13}$ alkyl-di-lower alkyl amine oxides, especially:

beta-methyl-dodecyl-dimethyl amine oxide
beta-ethyl-unidecyl-dimethyl amine oxide
beta-n-propyl-decyl-dimethyl amine oxide
beta-isopropyl-decyl-dimethyl amine oxide
beta-butyl-nonyl-dimethyl amine oxide
beta-amyl-octyl-dimethyl amine oxide and the corresponding $C_{13}$-alkyl-diethyl amine oxides and $C_{13}$-alkyl methyl-ethyl amine oxides as well as the $C_{15}$-alkyl-di-lower alkyl amine oxides, especially beta-methyl-tetradecyl-dimethyl amine oxide
beta-ethyl-tridecyl-dimethyl amine oxide
beta-n-propyl-dodecyl-dimethyl amine oxide
beta-isopropyl-dodecyl-dimethyl amine oxide
beta-butyl-undecyl-dimethyl amine oxide
beta-amyl-decyl-dimethyl amine oxide and the corresponding pentadecyl diethyl amine oxides and pentadecyl methyl-ethyl amine oxides are equally advantageous.

Also included among the new compounds of the invention are branched long-chain-alkyl-di-lower alkyl amine oxides which have an even number of carbon atoms in their long alkyl chains, particularly the dodecyl-di-lower alkyl amine oxides, especially:

beta-methyl-undecyl-dimethyl amine oxide
beta-ethyl-decyl-dimethyl amine oxide
beta-propyl-nonyl-dimethyl amine oxide
beta-butyl-octyl-dimethyl amine oxide
beta-amyl-he-tyl-dimethyl amine oxide and the corresponding diethyl and methyl-ethyl amine oxides such as beta-methyl-undecyl-diethyl amine oxide and beta-methyl-undecyl-methyl-ethyl amine oxide, for instance, and the tetradecyl-di-lower alkyl amine oxides of the following are representative:

beta-methyl-tridecyl-dimethyl amine oxide
beta-ethyl-dodecyl-dimethyl amine oxide
beta-propyl-undecyl-dimethyl amine oxide
beta-butyl-decyl-dimethyl amine oxide
beta-amyl-nonyl-dimethyl amine oxide and the corresponding diethyl, methyl-ethyl, and like tetradecyl amine oxides such as beta-methyl tridecyl diethyl amine oxide, and beta-methyl tridecyl methyl-ethyl amine oxide.

These are all new compounds which are useful alone or in combination with other tertiary amine oxides. Particularly useful are those having 13 to 21 carbon atoms per molecule because of their special effectiveness in improving the properties of tertiary amine oxides having only normal alkyl groups in the molecule, for instance the $C_{10}$ to $C_{18}$ normal alkyl-di-lower alkyl amine oxides and mixtures thereof, particularly those whose long-chain alkyl groups are derived from the center cut of the normal primary alcohols from coconut oil fatty acids and contain predominantly 12 and 14 carbon atoms per molecule.

It is an advantage of the new tertiary amine oxides and their previously described mixtures that the olefin hydroformylation alcohols from which they are produced can also serve as the source of sulfate-type detergents for use therewith. Instead of the mixtures with the ammonium salts of the sulfated ethoxylated alcohols illustrated in the formulations of Example V, one can use alkali metal and can employ different proportions of alkoxy groups of 2 to 3 carbon atoms. Proportions in the range of 1 to about 10 alkoxy groups per mole of alcohol are generally useful in making the sulfate salts. Instead of alkoxylating the alcohols, they can be sulfated directly and the sulfate salts then can be used with the new amine oxides of the invention in making advantageous detergent compositions. Hydroformylation alcohols of 10 to 18 car-

We claim as our invention:

1. A tertiary amine oxide having the formula

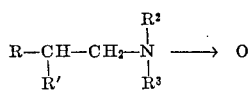

wherein

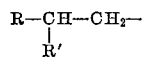

is an alkyl group containing 10 to 18 carbon atoms in which R represents a normal, primary alkyl chain and R' represents a normal, primary alkyl group of 1 to 5 carbon atoms, and $R^2$ and $R^3$ each represent lower alkyl groups.

2. A $C_{12}$ to $C_{16}$ alkyl dimethyl amine oxide wherein the $C_{12}$ to $C_{16}$ alkyl group is a primary alkyl group having attached to the beta-carbon atom a primary straight-chain alkyl group of 1 to 5 carbon atoms as the only branching on the chain.

3. A mixture of $C_{12}$ to $C_{16}$ alkyl-di-lower alkyl tertiary amine oxides consisting essentially of 10 to 50% by weight of branched-chain $C_{12}$–$C_{16}$ alkyl amine oxides having the formula

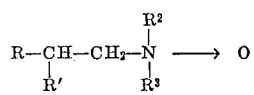

with the remainder of said mixture being $C_{12}$–$C_{16}$ normal alkyl amine oxides of the formula

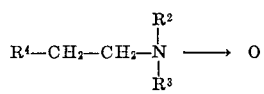

wherein R represents an alkyl radical containing 6 to 13 carbon atoms, R' represents a normal alkyl radical containing 1 to 5 carbon atoms, $R^2$ and $R^3$ represent lower alkyl radicals of 1 to 3 carbon atoms each, and $R^4$ represents a normal alkyl radical containing 10 to 14 carbon atoms.

4. A mixture of $C_{12}$ to $C_{16}$ alkyl-dimethyl amine oxides consisting essentially of 10 to 35% by weight of branched-chain $C_{12}$ to $C_{16}$ primary alkyl dimethyl amine oxide having an alkyl group of 1 to 5 carbon atoms attached to the beta-carbon atom as the only side chain in the $C_{12}$ to $C_{16}$ alkyl group, the remainder of said mixture of amine oxides being $C_{12}$ to $C_{16}$-normal primary alkyl dimethyl amine oxides.

5. The mixture of $C_{12}$ through $C_{16}$ alkyl-di-lower alkyl amine oxides containing a preponderance of normal primary $C_{12}$ to $C_{16}$ alkyl radicals together with the corresponding amine oxides having $C_{12}$ to $C_{16}$ primary alkyl radicals which contain a lower alkyl side chain attached to the beta-carbon atom, derived from the admixtures of tertiary alkyl amines which are obtained by reacting a di-lower-alkyl amine with the mixture of straight- and branched-chain primary alcohols produced by hydroformylation with carbon monoxide and hydrogen of a $C_{11}$ through $C_{15}$ fraction of essentially straight-chain alpha-olefins.

6. A mixture of $C_{12}$ through $C_{16}$ primary alkyl dimethyl amine oxides in accordance with claim 5 wherein the side chains on the branched chain $C_{12}$ to $C_{16}$-primary alkyl groups are preponderantly methyl groups.

References Cited

UNITED STATES PATENTS

| | | | |
|---|---|---|---|
| 3,215,741 | 11/1965 | Chadwick et al. | 260—583 |
| 3,270,060 | 8/1966 | Wakeman et al. | 260—583 |

FOREIGN PATENTS

| | | |
|---|---|---|
| 606,408 | 7/1961 | Belgium. |
| 436,414 | 10/1935 | Great Britain. |
| 437,566 | 2/1935 | Great Britain. |
| 638,754 | 6/1950 | Great Britain. |

CHARLES B. PARKER, *Primary Examiner.*

R. L. RAYMOND, *Assistant Examiner.*